(12) United States Patent
Lafargue et al.

(10) Patent No.: US 10,961,867 B2
(45) Date of Patent: Mar. 30, 2021

(54) TURBOSHAFT ENGINE EMBEDDABLE IN A REDUCTION GEARBOX

(71) Applicant: SAFRAN HELICOPTER ENGINES, Bordes (FR)

(72) Inventors: Olivier Lafargue, Moissy-Cramayel (FR); Sébastien Brotier, Moissy-Cramayel (FR); Alphonse Puerto, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 344 days.

(21) Appl. No.: 15/566,836

(22) PCT Filed: Apr. 26, 2016

(86) PCT No.: PCT/FR2016/050977
§ 371 (c)(1),
(2) Date: Oct. 16, 2017

(87) PCT Pub. No.: WO2016/174341
PCT Pub. Date: Nov. 3, 2016

(65) Prior Publication Data
US 2018/0119571 A1    May 3, 2018

(30) Foreign Application Priority Data
Apr. 27, 2015    (FR) ..................... 15 53751

(51) Int. Cl.
*F01D 25/16*    (2006.01)
*F02C 3/10*    (2006.01)
(Continued)

(52) U.S. Cl.
CPC .......... *F01D 25/16* (2013.01); *F01D 25/162* (2013.01); *F02C 3/103* (2013.01); *F02C 7/06* (2013.01);
(Continued)

(58) Field of Classification Search
CPC ........ F01D 5/026; F01D 25/16; F01D 25/162; F04D 29/05; F04D 29/053; F04D 29/054; F02C 7/32; F02C 7/36; F02C 3/107
See application file for complete search history.

(56) References Cited

U.S. PATENT DOCUMENTS

| 4,813,228 | A | * | 3/1989 | Hueller | ..................... F02C 3/10 60/39.511 |
| 7,055,303 | B2 | * | 6/2006 | MacFarlane | ............ F01D 25/18 184/6.11 |

(Continued)

FOREIGN PATENT DOCUMENTS

| FR | 2864157 A1 | 6/2005 |
| FR | 2961260 A1 | 12/2011 |

OTHER PUBLICATIONS

Written Opinion of the International Searching Authority dated Jul. 21, 2016, issued in corresponding International Application No. PCT/FR2016/050977, filed Apr. 26, 2016, 5 pages.
(Continued)

*Primary Examiner* — Brian P Wolcott
(74) *Attorney, Agent, or Firm* — Christensen O'Connor Johnson Kindness PLLC

(57) ABSTRACT

A turboshaft engine for a helicopter, comprising a case inside which a gas generator and a turbine are accommodated, the turbine being mounted on a power shaft that extends along a longitudinal direction. The turboshaft engine further comprises means for removably mounting the power shaft into a reduction gearbox inside which at least one gear of a first reduction stage is accommodated. The means for removably mounting the power shaft include a pinion having a central bore, the shape of which is adapted to that of the power shaft in such a way that the pinion can slide over the power shaft; furthermore, the contour of the pinion is adapted to the shape of the gear of the first stage (Continued)

Figure 1:
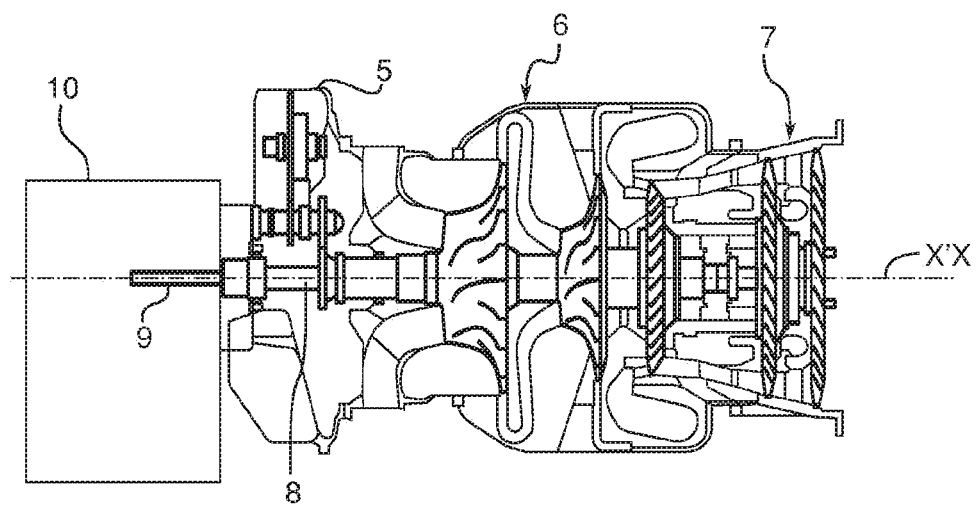

in such a way that the pinion can form a leading input pinion of the gearbox in said gear once the power shaft has been mounted in the reduction gearbox.

6 Claims, 2 Drawing Sheets

(51) Int. Cl.
*F02C 7/36* (2006.01)
*F02C 7/32* (2006.01)
*F02C 7/06* (2006.01)

(52) U.S. Cl.
CPC ............... *F02C 7/32* (2013.01); *F02C 7/36* (2013.01); *F05D 2220/329* (2013.01); *F05D 2230/51* (2013.01); *F05D 2230/70* (2013.01); *F05D 2230/72* (2013.01); *F05D 2260/4031* (2013.01); *Y02T 50/60* (2013.01)

(56) References Cited

U.S. PATENT DOCUMENTS

| | | | |
|---|---|---|---|
| 7,089,728 B2* | 8/2006 | Carney | B23K 15/0006 |
| | | | 60/39.511 |
| 8,006,501 B2* | 8/2011 | Dusserre-Telmon | F02C 7/32 |
| | | | 60/802 |
| 8,794,107 B2* | 8/2014 | Rollins | F16H 57/0456 |
| | | | 74/606 R |
| 9,850,820 B2* | 12/2017 | Pettinotti | F01D 25/164 |
| 10,247,107 B2* | 4/2019 | Morelli | F01D 25/16 |
| 10,336,442 B2* | 7/2019 | Bedrine | F02C 7/36 |
| 2005/0132695 A1 | 6/2005 | Carney | |
| 2013/0089409 A1 | 4/2013 | Bedrine et al. | |

OTHER PUBLICATIONS

International Preliminary Report of Patentability dated Oct. 31, 2017, issued in corresponding International Application No. PCT/FR2016/050977, filed Apr. 26, 2016, 1 page.
International Search Report mailed Jul. 21, 2016, issued in corresponding International Application No. PCT/FR2016/050977, filed Apr. 26, 2016, 3 pages.

* cited by examiner

TURBOSHAFT ENGINE EMBEDDABLE IN A REDUCTION GEARBOX

1. TECHNICAL FIELD OF THE INVENTION

The invention relates to turboshaft engines for aircraft, in particular turboshaft engines which can be embedded in a reduction gearbox, such as a power transmission gearbox.

2. TECHNICAL BACKGROUND

A turboshaft engine comprises, in a known manner, a gas generator and a turbine mounted on a shaft, referred to as a power shaft, extending in a direction, referred to as a longitudinal direction. Said power shaft is designed so as to be able to be mechanically connected to a reduction gearbox. Said reduction gearbox is for example, in the case of a helicopter, a power transmission gearbox connected to the rotor(s) of the helicopter. When the power shaft of the turbine and the reduction gearbox are mechanically coupled, the power of the power shaft is transmitted to the power transmission gearbox, and this makes it possible to set into rotation the rotor(s) of the helicopter.

The power shaft of the turbine is, for its part, set into rotation by the turbine which receives the gases produced by the gas generator and which expands them, and this makes it possible to transform the kinetic energy of the received gases into a mechanical energy recovered by the power shaft.

The turbine can be a free turbine of the gas generator or a turbine connected to the gas generator. Throughout the text, the invention is described in connection with a free turbine. That being said, the invention also applies to a turboshaft engine comprising a turbine connected to the gas generator.

The power shaft thus comprises two ends, one end, referred to as the power end, which is designed to be connected to the reduction gearbox, and an opposite end, referred to as the free end, which typically supports the blades of the free turbine. Said power end is generally applied to the front of the turboshaft engine in the region of the reduction gearbox and is thus also referred to by the term front end. Reference is thus made to front mounting of the turboshaft engine on the reduction gearbox.

The inventors have sought to design a turboshaft engine which can be easily mounted on a reduction gearbox and detached therefrom, for example for maintenance operations. The inventors have sought in particular to propose a solution which makes it possible to connect the power end of the power shaft to a reduction gearbox.

3. AIMS OF THE INVENTION

The invention aims to provide, in at least one embodiment of the invention, a turboshaft engine which can be easily mounted on a reduction gearbox, such as a power transmission gearbox.

The invention also aims to provide, in at least one embodiment of the invention, a turboshaft engine which contributes to limiting the axial bulk of the assembly formed by the turboshaft engine and the gearbox when the turboshaft engine is mounted on the reduction gearbox.

The invention also aims to provide, in at least one embodiment of the invention, a turboshaft engine which contributes to limiting the mass of the assembly formed by the turboshaft engine and the gearbox when the turboshaft engine is mounted on the reduction gearbox.

The invention also aims to provide, in at least one embodiment, an aircraft, in particular a helicopter, equipped with at least one turboshaft engine according to the invention.

4. SUMMARY OF THE INVENTION

For this purpose, the invention relates to a turboshaft engine for a helicopter, comprising a housing in which is arranged a gas generator and a turbine mounted on a power shaft extending in a longitudinal direction and means for removably embedding said power shaft in a reduction gearbox in which is arranged at least one gearwheel of a first reduction stage, said means for removable embedding comprising a pinion having a central bore adapted to said power shaft in such a way that said pinion can be fitted on said power shaft, said pinion further having a periphery adapted to said gearwheel of the first stage in such a way that it can form a driving input pinion of the gearbox meshed with said gearwheel, once said power shaft is embedded in said reduction gearbox.

A turboshaft engine according to the invention is equipped with means for removably embedding the power shaft in a reduction gearbox. Said means for removably embedding the power shaft in a reduction gearbox form a kit for embedding the turboshaft engine on a reduction gearbox, that is to say that they provide the turboshaft engine with which they are associated with the functionality of being able to be directly embedded on a reduction gearbox and separated therefrom. Throughout the text, said embedding means are also referred to by the term "embedding kit" to highlight the fact that the embedding means form the embedding connection between the turboshaft engine and the reduction gearbox. A turboshaft engine according to the invention can thus be embedded directly on a reduction gearbox in such a way that it can be easily connected to the reduction gearbox when necessary and separated therefrom, for example for maintenance operations on the turboshaft engine. An embeddable turboshaft engine of this type according to the invention is designed so as to be able to be mounted directly on the reduction gearbox and to be held by said reduction gearbox. The embedding of the turboshaft engine on the reduction gearbox can be vertical, horizontal or diagonal embedding. This feature makes it possible to save significant mass on the overall drive chain of the aircraft. In particular, a turboshaft engine equipped with embedding means makes it possible to offset the bearings of the power shaft directly in the reduction gearbox and thus to limit the axial length of the turboshaft engine, said bearings supporting the power shaft only when the turboshaft engine is embedded in the reduction gearbox. The embedding kit formed by the embedding means comprises a pinion which is designed to be fitted onto the power shaft. The fitting of the pinion on the free turbine shaft is for example obtained by a grooved connection. Said connection can, according to one variant, be locked by a nut which rigidly connects the pinion to the power shaft of the free turbine or which opposes any longitudinal movement of the pinion along the power shaft. Once the pinion is fitted on and rigidly connected to the power shaft, the assembly formed by the turboshaft engine and the fitted pinion can be moved in the reduction gearbox. The pinion is designed in such a way that, once accommodated in the reduction gearbox, it can mesh with the gearwheel of the reduction gearbox and thus form the driving input pinion of the reduction gearbox.

Advantageously and according to the invention, the means for removable embedding further comprise a rear pinion bearing and a front pinion bearing each intended to support the assembly formed by said pinion fitted on said power shaft once said power shaft is embedded in said reduction gearbox in the vicinity of a gearbox input and in the vicinity of a gearbox end which is longitudinally opposite said gearbox input respectively, each front and rear bearing further comprising rolling elements, an inner ring intended to be centred in abutment against the pinion, and an outer ring intended to be centred in abutment against the reduction gearbox.

According to this variant, the embedding kit further comprises front and rear bearings of the pinion intended to support the power end of the power shaft directly in the reduction gearbox and to allow the rotation thereof. In other words, the bearings of the power shaft are part of the embedding kit and are designed to be offset in the reduction gearbox. Said bearings are formed by the bearings of the pinion forming the driving pinion of the first reduction stage of the reduction gearbox, once the power shaft is embedded on the reduction gearbox.

Advantageously and according to one variant of the invention, the rear bearing of said pinion is rigidly connected to said housing, said rolling elements and the inner ring of said front bearing are mounted on said power shaft, and said outer ring of said front bearing is designed so as to be able to be accommodated in said reduction gearbox and rigidly connected to said reduction gearbox before said power shaft is embedded in said reduction gearbox.

According to this variant, the rear bearing of the driving pinion is rigidly connected to the housing of the turboshaft engine, and the inner and outer rings of the front bearing are, despite being paired to one another, separated from one another: the inner ring and the rolling elements of the front bearing are mounted on the power shaft of the turboshaft engine, whereas the outer ring of the front bearing is fixed on the reduction gearbox. The outer ring can for example be mounted in the reduction gearbox prior to the movement of the assembly formed by the power shaft, the pinion fitted on the power shaft, the rear bearing, the outer ring and the rolling elements of the front bearing, which are rigidly connected to the housing of the turboshaft engine. In other words, the front bearing is brought together again only when the turboshaft engine is embedded in the reduction gearbox. The inner ring is then accommodated opposite the outer ring previously mounted in the reduction gearbox.

Advantageously and according to another variant of the invention, said means for removable embedding comprise a cage for supporting bearings which is suitable for being rigidly connected to said housing of the turboshaft engine, said cage supporting said front and rear bearings of said front pinion in a rigidly connected manner, and said cage being adapted so as to bear against at least two centring portions provided in said reduction gearbox.

According to this variant, the front and rear bearings of the pinion are supported by a cage for supporting bearings. In other words, contrary to the preceding variant, both the front bearing and the rear bearing are rigidly connected to the housing of the turboshaft engine, by means of the cage for supporting bearings. Said cage is further designed so as to be able to cooperate with centring portions provided in the reduction gearbox.

Advantageously and according to this variant, the cage comprises at least one radial flat surface in which an opening is provided, through which a peripheral portion of the pinion can extend to ensure the meshing of said pinion with said gearwheel of the first stage.

The opening provided in a radially extending flat surface makes it possible to ensure the mechanical connection between the pinion of the embedding kit forming the driving input pinion of the gearbox and the pinion gear of the first reduction stage. Furthermore, said flat surface makes it possible to avoid interference with the wheel of the first stage during operations of embedding the turboshaft engine in the reduction gearbox and during operations of detaching the turboshaft engine from the reduction gearbox.

Advantageously and according to the invention, the reduction gearbox is a power transmission gearbox. The power transmission gearbox is connected to the rotor(s) of the helicopter. When the power shaft of the turbine and the power transmission gearbox are mechanically coupled, the power of the power shaft is transmitted to the power transmission gearbox, and this makes it possible to set into rotation the rotor(s) of the helicopter.

The invention also relates to a helicopter comprising at least one turboshaft engine according to the invention.

The invention also relates to a turboshaft engine and to a helicopter equipped with a turboshaft engine, characterised in combination by all or some of the features mentioned above or below.

5. LIST OF THE DRAWINGS

Figure 2:
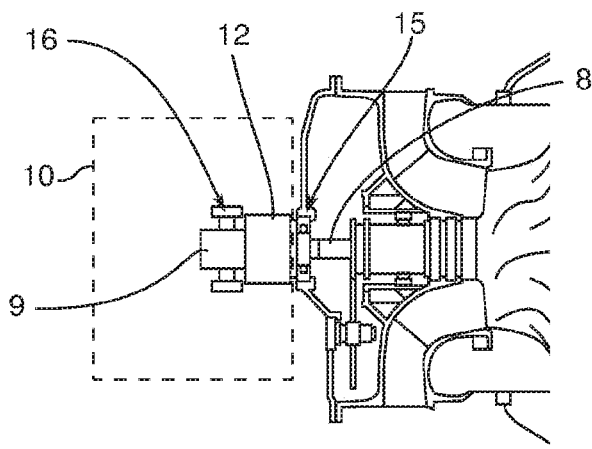
Figure 3:
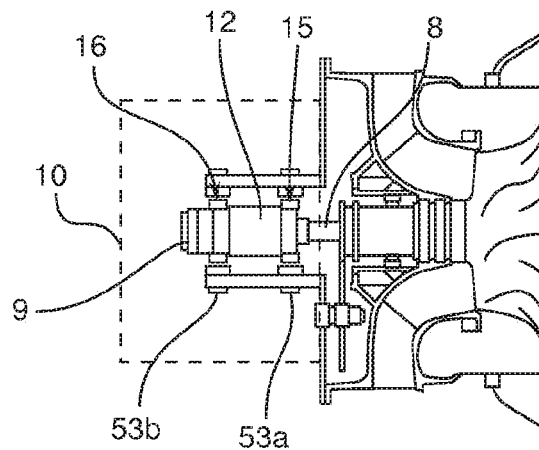
Figure 4:
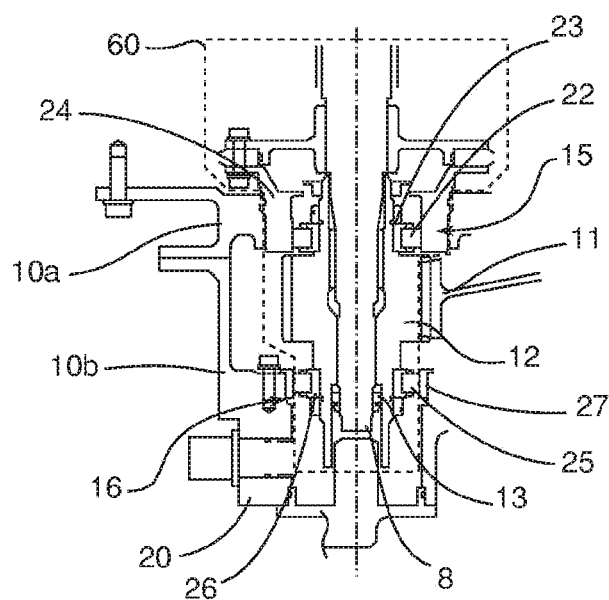
Figure 5:
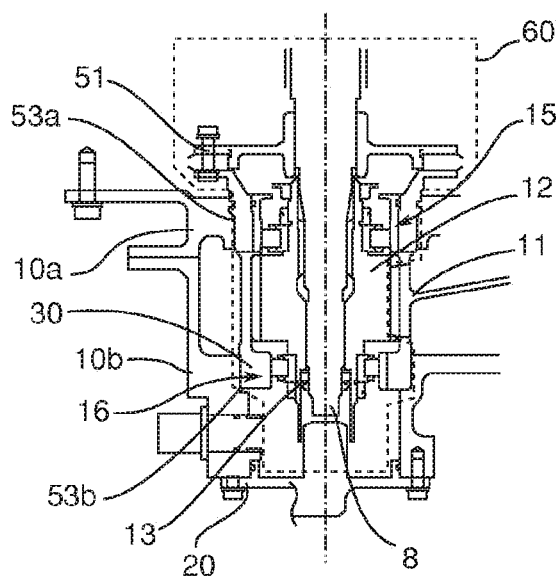
Figure 6:
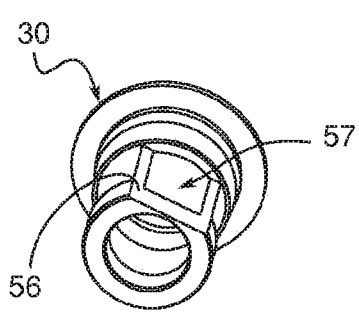
Figure 7:
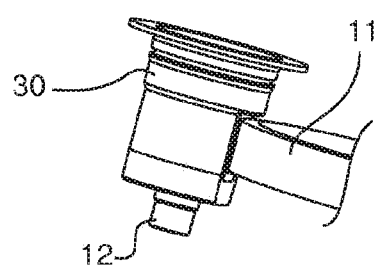

Other aims, features and advantages of the invention will become apparent upon reading the following description which is provided purely on a non-limiting basis and relates to the accompanying drawings, in which:

FIG. 1 is a schematic sectional view of a turboshaft engine according to one embodiment of the invention, FIG. 2 is a partial schematic side view of a turboshaft engine according to one embodiment of the invention, FIG. 3 is a partial schematic side view of a turboshaft engine according to another embodiment of the invention, FIG. 4 is a schematic sectional view of a detail of the turboshaft engine according to the embodiment from FIG. 2, FIG. 5 is a schematic sectional view of a detail of the turboshaft engine according to the embodiment from FIG. 3, FIG. 6 is a schematic perspective view of a cage for supporting bearings of a turboshaft engine according to the embodiment from FIGS. 3 and 5, FIG. 7 is a schematic perspective view of the cage for supporting bearings from FIG. 6 in mechanical interaction with a gearwheel of a first reduction stage of a reduction gearbox.

6. DETAILED DESCRIPTION OF EMBODIMENTS OF THE INVENTION

In the drawings, the scales and the proportions are not strictly respected for the sake of illustration and clarity. Throughout the following detailed description, with reference to the drawings, unless indicated otherwise, each element of the turboshaft engine is described as it is arranged when the turboshaft engine is in the horizontal mounting position, embedded on a reduction gearbox. This arrangement is shown in particular in FIG. 1. Furthermore, the terms "axial", "longitudinal", "front" and "rear" relate to locations along the centre line X'X of the turboshaft engine. More precisely, throughout the text and in connection with FIGS. 1 and 3, the front of the turboshaft engine is the portion on the left in the drawings, whereas the rear is the portion on the right. In connection with FIGS. 4 and 5, the front of the turboshaft engine is the lower portion, and the rear is the upper portion. The term "radial" relates to locations perpendicular to said centre line. Lastly, elements having the same reference signs in different drawings relate to identical elements or to elements having a similar function.

As shown in FIG. 1, a turboshaft engine according to the invention comprises a housing 5 in which a gas generator 6 and a free turbine 7 are mounted. The free turbine 7 is rigidly connected to a power shaft 8. According to the embodiment in the drawings, the power shaft 8 which supports the free turbine 7 and which makes it possible to connect the turboshaft engine to a reduction gearbox 10 passes inside the shaft of the gas generator in such a way that the power end 9 of the power shaft is on the side of the gas generator. The gas generator 6 and the operation thereof are not described in detail and are well known to persons skilled in the art. It will be appreciated that the invention also applies to a turboshaft engine having a power shaft which does not pass through the gas generator, and the power end of which is thus on the opposite side to the gas generator. In other words, the invention applies both to a front mounting and to a rear mounting of a turboshaft engine on a reduction gearbox.

A turboshaft engine according to the invention further comprises means for removably embedding the power shaft 8 in a reduction gearbox 10 in which is arranged at least one gearwheel 11 of a first reduction stage. Said gearwheel 11 is shown in FIGS. 4 and 5. Said gearwheel can be any type of gearwheel having a castellated periphery which is suitable for being set into rotation by a driving pinion. The reduction gearbox 10 comprises for example, and as shown in FIGS. 4 and 5, an upper housing 10a and a lower housing 10b which are rigidly interconnected by fixing means of the screw/nut type.

The means for removably embedding the power shaft 8 in the reduction gearbox 10 form an embedding kit. Said embedding kit is formed by a plurality of parts which are described hereafter, and which, once assembled with one another and/or rigidly connected either to the housing of the turboshaft engine or to the reduction gearbox, make it possible to embed the turboshaft engine in the reduction gearbox.

Said embedding kit comprises a pinion 12 having a central bore which has a shape and size which are adapted to, and interlinked with, the circumference of the power shaft 8. For example, the central bore of the pinion 8 is grooved with six portions adapted to the circumference having six portions of the power shaft. This makes it possible to connect the pinion 12 to the power shaft 8 for conjoint rotation once the pinion is fitted on the power shaft 8. According to the embodiment in the drawings and as shown in FIGS. 3 and 4, the embedding kit further comprises a nut 13 mounted around the end of the power shaft 8 to longitudinally stop the pinion 12 fitted on the power shaft 8. The pinion 12 is fitted on the power shaft 8 prior to the movement of the assembly formed by the pinion and the shaft in the reduction gearbox 10.

The embedding kit further comprises a rear pinion bearing 15 and a front pinion bearing 16. The rear pinion bearing 15 is arranged, once the power shaft 8 is embedded in the reduction gearbox 10, in the vicinity of the input of the reduction gearbox 10. The front pinion bearing 16 is arranged, once the power shaft 8 is embedded in the reduction gearbox 10, in the vicinity of a gearbox end 20 which is longitudinally opposite the gearbox input.

The rear bearing 15 comprises rolling elements 22, an inner ring 23, which is centred in abutment against the pinion 12 once the turboshaft engine is embedded in the reduction gearbox, and an outer ring 24 which is centred in abutment against the upper housing 10a of the reduction gearbox 10, once the turboshaft engine is embedded in the reduction gearbox.

The front bearing 16 comprises rolling elements 25, an inner ring 26 which is centred in abutment against the pinion 12 once the turboshaft engine is embedded in the reduction gearbox, and an outer ring 27 which is centred in abutment against the lower housing 10b of the reduction gearbox once the turboshaft engine is embedded in the reduction gearbox.

According to the embodiment in FIGS. 2 and 4, the rear bearing 15 is rigidly connected to the housing 5 of the turboshaft engine, and the rolling elements 25 and the inner ring 26 of the front bearing 16 are mounted on the power shaft 8. The outer ring 27 of the front bearing 16 is rigidly connected to the lower housing 10b of the reduction gearbox 10. The outer ring 27 of the front bearing 16 is mounted on, and rigidly connected to, the reduction gearbox 10 before the descent of the power shaft 8 on which the pinion 12 is fitted and on which the inner ring 26 and the rolling elements 25 of the front bearing 16 are mounted. The diameter of the outer ring 27 is selected in such a way that it can pass into a bore in the upper housing 10a of the reduction gearbox. The width of the outer ring 27 is selected in such a way that it can pass between the lower face of the gearwheel 11 of the first reduction stage and the lower face of the lower housing 10b of the reduction gearbox so as to be able to be accommodated in the lower housing 10b of the reduction gearbox. According to another variant, the outer ring 27 can be mounted in the reduction gearbox through the bottom of the gearbox, that is to say through the lower housing 10b of the reduction gearbox 10. A turboshaft engine according to this embodiment thus allows the embedding thereof in a reduction gearbox. The power shaft 8 is held by forming front and rear bearings described in connection with FIGS. 2 and 4.

According to another embodiment and as described in connection with FIGS. 3 and 5, the means for embedding the power shaft 8 in the reduction gearbox comprise a cage 30 for supporting bearings. Said cage is rigidly connected to the housing 5 of the turboshaft engine, for example by means of the screw/nut 51 type. The cage 30 for supporting bearings supports the front bearing 16 and the rear bearing 15 of the pinion 12 in a rigidly connected manner. The cage 30 further has a periphery adapted to centring portions 53a, 53b provided in the upper housing 10a and the lower housing 10b respectively of the reduction gearbox 10. Thus, once mounted on the housing 5 of the turboshaft engine in a rigidly connected manner, the assembly formed by the power shaft 8 and the cage 30 can be embedded in the reduction gearbox, and the cage bears against the centring portions 53a, 53b. The power shaft 8 is then held in the reduction gearbox.

The cage 30 further comprises a radial flat surface 56 in which an opening 57 is provided, which allows the passage of the pinion 12 and the meshing thereof with the wheel 11 of the first reduction stage. This link between the pinion 12 and the wheel 11 through the opening 57 in the cage 30 is shown schematically by FIG. 7. In FIG. 7, only the lower portion of the pinion 12 is visible. The castellated portion of the pinion 12 adapted to the gearwheel 11 extends inside the cage 30 for supporting bearings.

In FIGS. 4 and 5, the assembly formed by the power shaft 8, the pinion 12 fitted on the power shaft 8 and elements of bearings rigidly connected to the shaft or the housing (cage 30 for the embodiment in FIG. 5; rear bearing 15, rolling element and inner ring of the front bearing for the embodiment in FIG. 4) and which is moved in the reduction gearbox 10 to ensure the embedding is delimited schematically by the dotted lines 60.

The invention claimed is:

1. A turboshaft engine for a helicopter, comprising:
a housing in which is arranged a gas generator and a turbine mounted on a power shaft extending in a longitudinal direction;
means for removably embedding said power shaft in a reduction gearbox in which is arranged at least one gearwheel of a first reduction stage, said means for removable embedding comprising a pinion having a central bore adapted to said power shaft in such a way that said pinion is fitted directly on said power shaft, said pinion further having a periphery adapted to said gearwheel of the first reduction stage to form a driving input pinion of the gearbox meshed with said gearwheel, once said power shaft is embedded in said reduction gearbox,
said means for removable embedding further comprising a rear pinion bearing and a front pinion bearing, each configured to support an assembly formed by said pinion fitted directly on said power shaft once said power shaft is embedded in said reduction gearbox in a vicinity of a gearbox input and in a vicinity of a gearbox end which is longitudinally opposite said gearbox input, respectively, each front and rear pinion bearing further comprising rolling elements, an inner ring configured to be centered in abutment against the pinion and an outer ring configured to be centered in abutment against the reduction gearbox, wherein said rear pinion bearing of said pinion is directly affixed to said housing of the turboshaft engine, said rolling elements and the inner ring of said front pinion bearing are mounted on the power shaft, and said outer ring of said front pinion bearing is configured to be able to be accommodated in said reduction gearbox and rigidly connected to said reduction gearbox before said power shaft is embedded in said reduction gearbox.

2. A turboshaft engine for a helicopter, comprising:
a housing in which is arranged a gas generator and a turbine mounted on a power shaft extending in a longitudinal direction;
means for removably embedding said power shaft in a reduction gearbox in which is arranged at least one gearwheel of a first reduction stage, said means for removable embedding comprising a pinion having a central bore adapted to said power shaft in such a way that said pinion is fitted directly on said power shaft, said pinion further having a periphery adapted to said gearwheel of the first reduction stage so as to form a driving input pinion of the gearbox meshed with said gearwheel, once said power shaft is embedded in said reduction gearbox,
said means for removable embedding further comprise a rear pinion bearing and a front pinion bearing each configured to support an assembly formed by said pinion fitted directly on said power shaft once said power shaft is embedded in said reduction gearbox in a vicinity of a gearbox input and in a vicinity of a gearbox end which is longitudinally opposite said gearbox input, respectively, each front and rear pinion bearing further comprising rolling elements, an inner ring configured to be centered in abutment against the pinion and an outer ring configured to be centered in abutment against the reduction gearbox,
wherein said means for removable embedding further comprises a cage for supporting bearings which is directly affixed to said housing of the turboshaft engine, said cage supporting said front pinion bearing and said rear pinion bearing in a rigidly connected manner, and said cage being adapted to bear against at least two centering portions provided in said reduction gearbox.

3. A turboshaft engine for a helicopter, comprising:
a housing in which is arranged a gas generator and a turbine mounted on a power shaft extending in a longitudinal direction;
means for removably embedding said power shaft in a reduction gearbox in which is arranged at least one gearwheel of a first reduction stage, said means for removable embedding comprising a pinion having a central bore adapted to said power shaft in such a way that said pinion can be fitted on said power shaft, said pinion further having a periphery adapted to said gearwheel of the first reduction stage so as to form a driving input pinion of the gearbox meshed with said gearwheel, once said power shaft is embedded in said reduction gearbox,
said means for removable embedding said power shaft further comprise a rear pinion bearing and a front pinion bearing each configured to support an assembly formed by said pinion fitted on said power shaft once said power shaft is embedded in said reduction gearbox in a vicinity of a gearbox input and in a vicinity of a gearbox end which is longitudinally opposite said gearbox input, respectively, each front and rear pinion bearing further comprising rolling elements, an inner ring configured to be centered in abutment against the pinion and an outer ring configured to be centered in abutment against the reduction gearbox,
wherein said means for removable embedding said power shaft further comprises a cage for supporting bearings which is suitable for being rigidly connected to said housing of the turboshaft engine, said cage supporting said front pinion bearing and said rear pinion bearing in a rigidly connected manner, and said cage being adapted to bear against at least two centering portions provided in said reduction gearbox,
wherein said cage comprises at least one radial flat surface in which an opening is provided, through which a peripheral portion of the pinion can extend to ensure a meshing of said pinion with said gearwheel of the first stage.

4. The turboshaft engine for a helicopter according to claim 1, wherein the reduction gearbox is a power transmission gearbox.

5. A helicopter comprising at least one turboshaft engine according to claim 1.

6. A helicopter comprising at least one turboshaft engine according to claim 2.

* * * * *